(No Model.)
J. W. B. COOK.
NUT LOCK.
No. 499,872. Patented June 20, 1893.
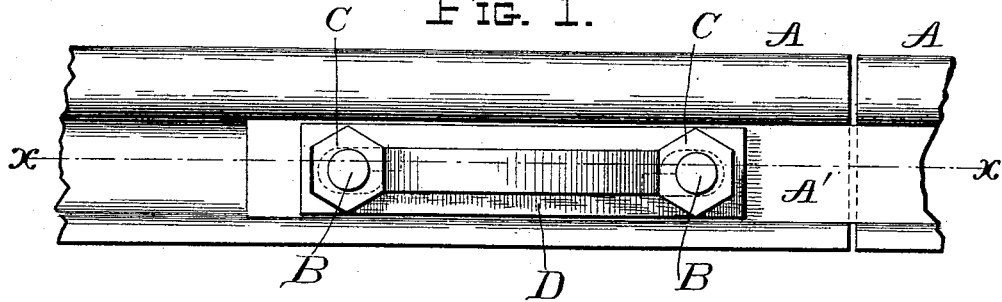
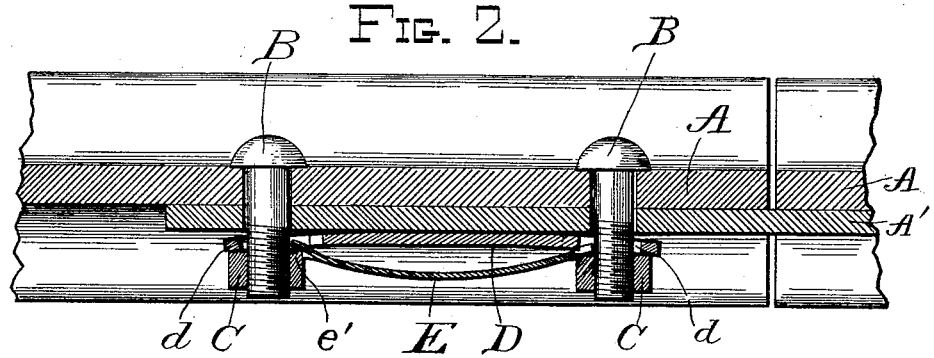
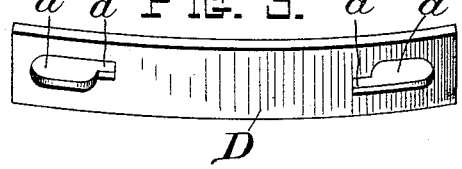
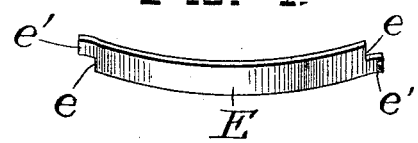
Witnesses
Inventor
John W. B. Cook,
By Whitman & Wilkinson,
Attorneys.

UNITED STATES PATENT OFFICE.

JOHN W. B. COOK, OF CAMDEN, ARKANSAS.

NUT-LOCK.

SPECIFICATION forming part of Letters Patent No. 499,872, dated June 20, 1893.

Application filed March 21, 1893. Serial No. 467,002. (No model.)

*To all whom it may concern:*

Be it known that I, JOHN W. B. COOK, a citizen of the United States, residing at Camden, in the county of Ouachita and State of Arkansas, have invented certain new and useful Improvements in Nut-Locks; and I do hereby declare the following to be a full, clear, and exact description of the invention, such as will enable others skilled in the art to which it appertains to make and use the same.

My invention relates to improvements in nut locks, and it consists especially of certain improvements on the device described in my Patent No. 490,740, dated January 31, 1893.

Reference is had to the accompanying drawings, wherein the same parts are indicated by the same letters throughout the several views.

Figure 1 represents a side elevation of a rail joint, and illustrates the use of the improved nut lock. Fig. 2 represents a section along the line $xx$ of Fig. 1, looking down. Fig. 3 represents a perspective view of the improved washer plate detached, and Fig. 4 represents a perspective view of the brace adapted to be sprung between and to hold the two nuts.

A represents the rails, A' the fish plate connecting the said rails, B the bolts made in the ordinary form, C the nuts which may be square or rectangular, as shown, D the washer plate, and E the locking brace. The washer plate D has oblong apertures $d$ near the ends thereof, which terminate in rectangular apertures $d'$, adapted to engage the lugs $e'$ on the end of the locking brace E. The plate D and brace E are both made of resilient material, preferably steel.

The operation of the device is as follows: The fish plate A' being in position, and the bolts B being inserted therethrough, and shown in Fig. 2, the bent washer plate D is put on with its curved middle tangent to the fish plate and its ends projecting outward from the fish plate, and the nuts C are screwed down firmly flattening the plate D along the fish plate, that is compressing its ends in toward the fish plate A'. The pressure of the ends of this spring plate D on the base of the nuts C, takes up the slack due to wear on the nuts and bolts from constant jarring, and also tends to prevent them from turning. But in order to effect the positive holding of the nuts, the ends $e'$ of the resilient plate E, are inserted in the apertures $d'$, the plate E being sprung up for the purpose as shown in Fig. 2. The shoulders $e$ then bear against the square faces of the nut, and prevent it from turning. It will be seen that the washer plate D and the spring brace E are both reversible, and that accidents cannot occur nor can time be lost by mistakes in placing the various parts. It will be seen that the spring plates D and E will give a firm yet sufficiently yielding means of holding the nuts in place, and preventing them from shaking loose under any ordinary jars or strains. Moreover the resiliency of the metal plates D and E will take up all ordinary wear of the bolts, nuts, or screw-threads.

Having thus described my invention, what I claim, and desire to secure by Letters Patent of the United States, is—

1. In a nut lock, the combination with two nuts of a bent resilient washer plate lying between and passing beneath both of said nuts, the said washer plate having an oblong hole therein near each nut and partially covered by the said nut; and a brace made of resilient metal somewhat longer than the distance between the said nuts and having at each end a tongue adapted to be sprung into said holes in the washer plate and to be partially covered by said nuts, and a bearing face adapted to press against one of the faces of said nuts, substantially as and for the purposes described.

2. In a nut lock, the combination with two bolts and nuts, of a bent resilient washer plate D having holes $d$ registering with said bolts and adapted to allow the same to enter freely, and prolongations $d'$ of said holes with parallel sides, the said holes being partially covered by the said nuts; the brace E made of resilient material and having bent arms $e'$ and bearing faces $e$, the said arms fitting in the said holes $d'$ and being partially covered by the said nuts, and each of the said bearing faces bearing against one of the sides of a nut, substantially as and for the purposes described.

In testimony whereof I affix my signature in presence of two witnesses.

JOHN W. B. COOK.

Witnesses:
E. B. CAWTHON,
JNO. B. WINFREY.